(No Model.) 3 Sheets—Sheet 1.

W. SWINDELL.
VALVE FOR FURNACES.

No. 544,799. Patented Aug. 20, 1895.

WITNESSES:
Chas. F. Miller
A. E. Gaither

INVENTOR,
William Swindell
by Darwin S. Wolcott
Att'y.

(No Model.) 3 Sheets—Sheet 2.
W. SWINDELL.
VALVE FOR FURNACES.
No. 544,799. Patented Aug. 20, 1895.
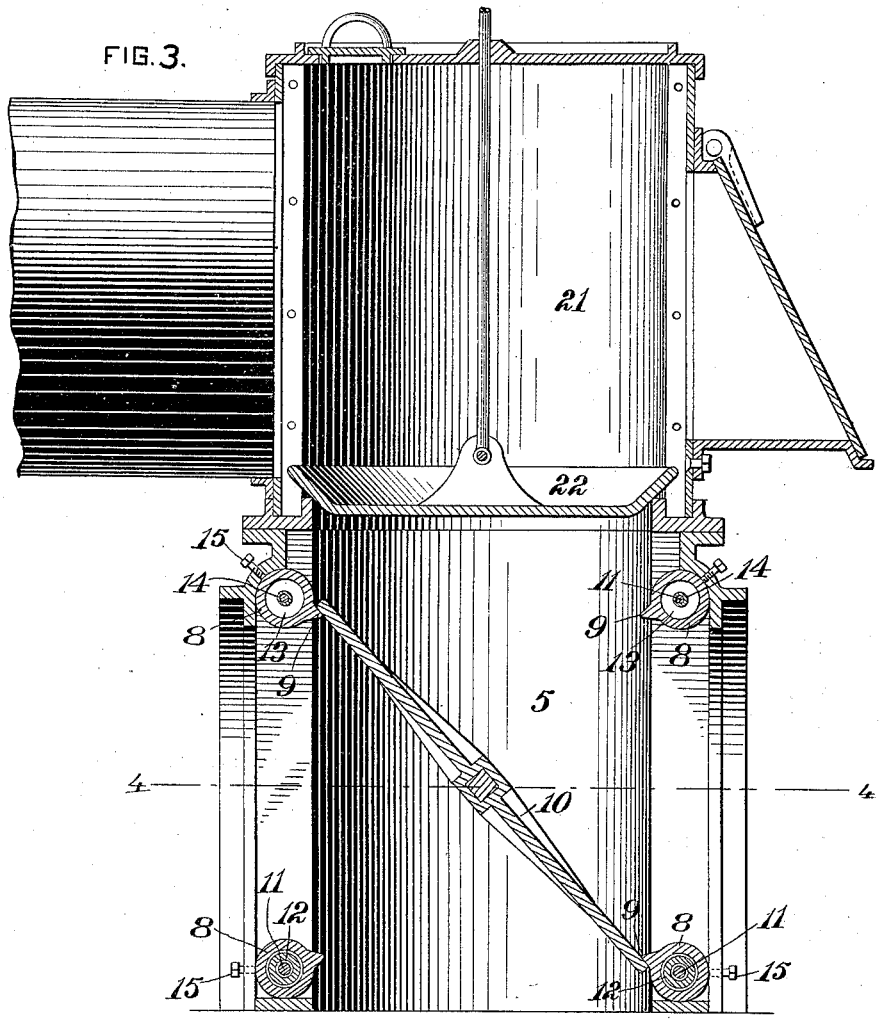
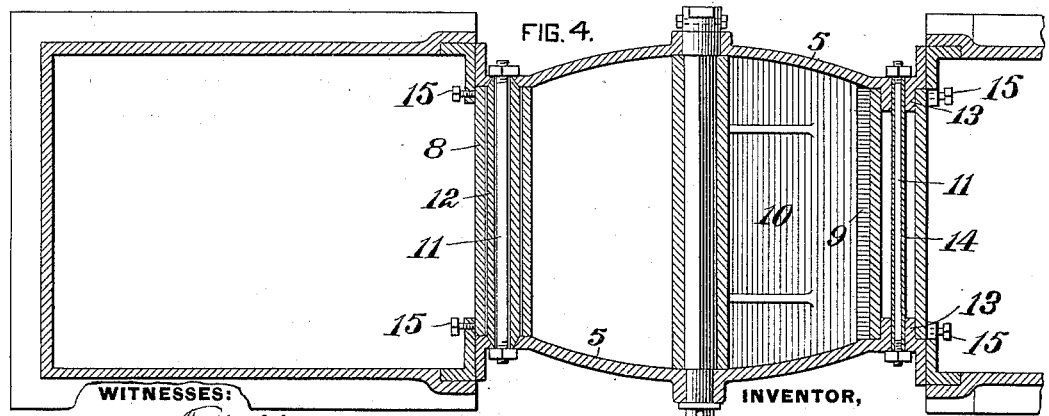

(No Model.) 3 Sheets—Sheet 3.
W. SWINDELL.
VALVE FOR FURNACES.

No. 544,799. Patented Aug. 20, 1895.

WITNESSES:
Chas F. Miller
F. E. Gaither

INVENTOR,
William Swindell
by Darwin S. Wolcott
Att'y.

UNITED STATES PATENT OFFICE.

WILLIAM SWINDELL, OF ALLEGHENY, PENNSYLVANIA.

VALVE FOR FURNACES.

SPECIFICATION forming part of Letters Patent No. 544,799, dated August 20, 1895.

Application filed December 20, 1894. Serial No. 532,416. (No model.)

*To all whom it may concern:*

Be it known that I, WILLIAM SWINDELL, a citizen of the United States, residing at Allegheny, in the county of Allegheny and State of Pennsylvania, have invented or discovered certain new and useful Improvements in Valves for Furnaces, of which improvements the following is a specification.

The invention described herein relates to certain improvements in reversing-valves for regenerative furnaces, and has for its object a construction of valve-seat capable of adjustment so as to permit of the adjustment of the valve itself in order to obtain a tight joint between the casing and the side edges of the valve.

In general terms the invention consists in the construction and combination substantially as hereinafter described and claimed.

Figure 1:
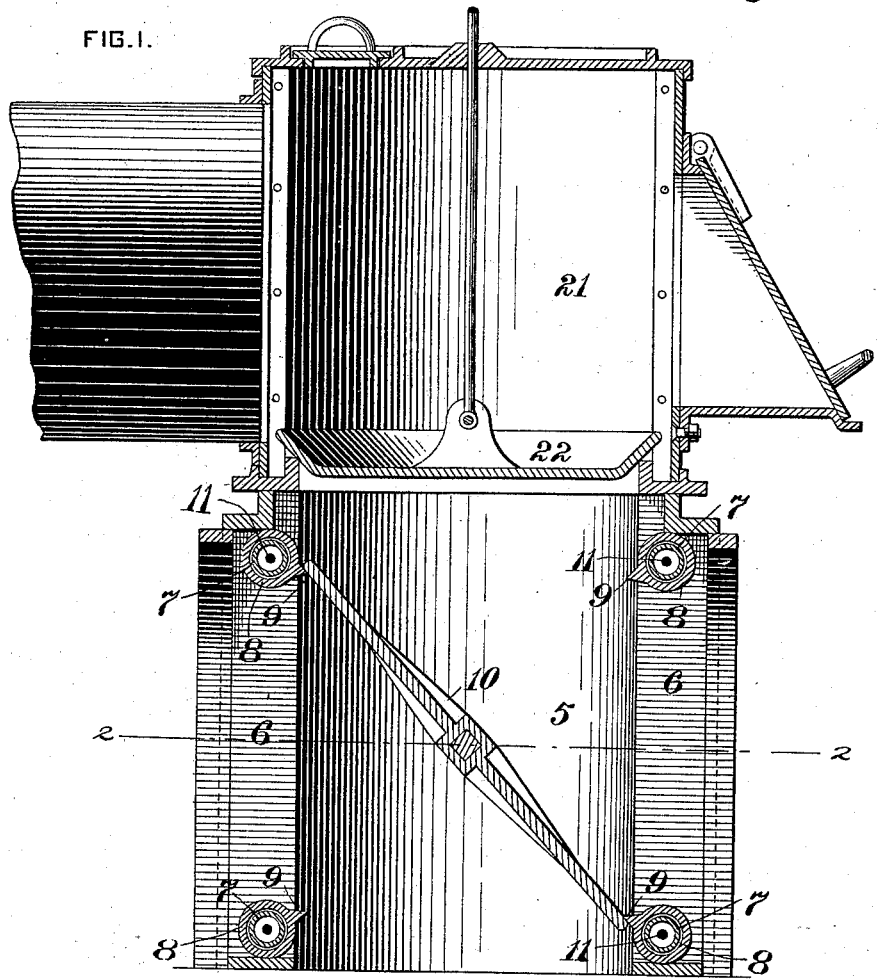
Figure 2:
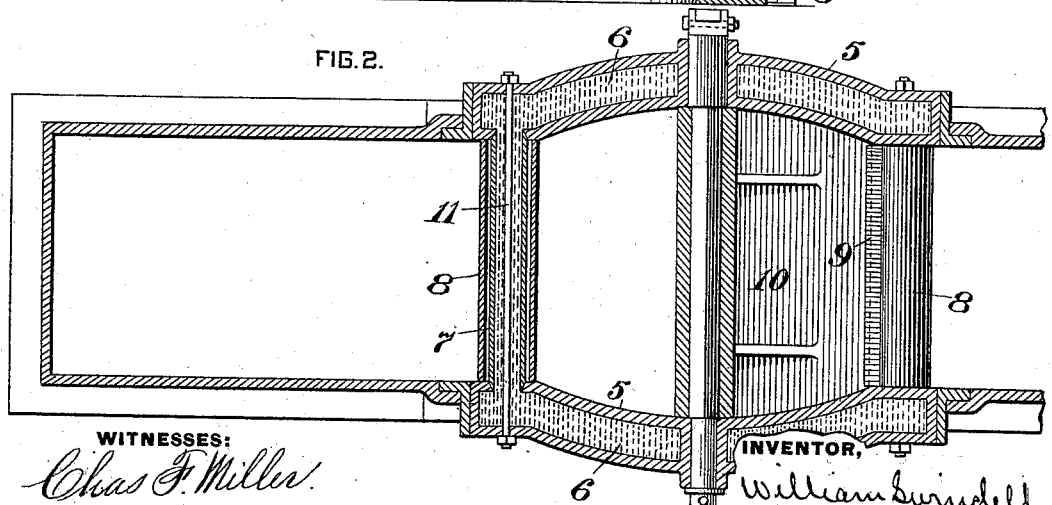
Figures 5, 6:
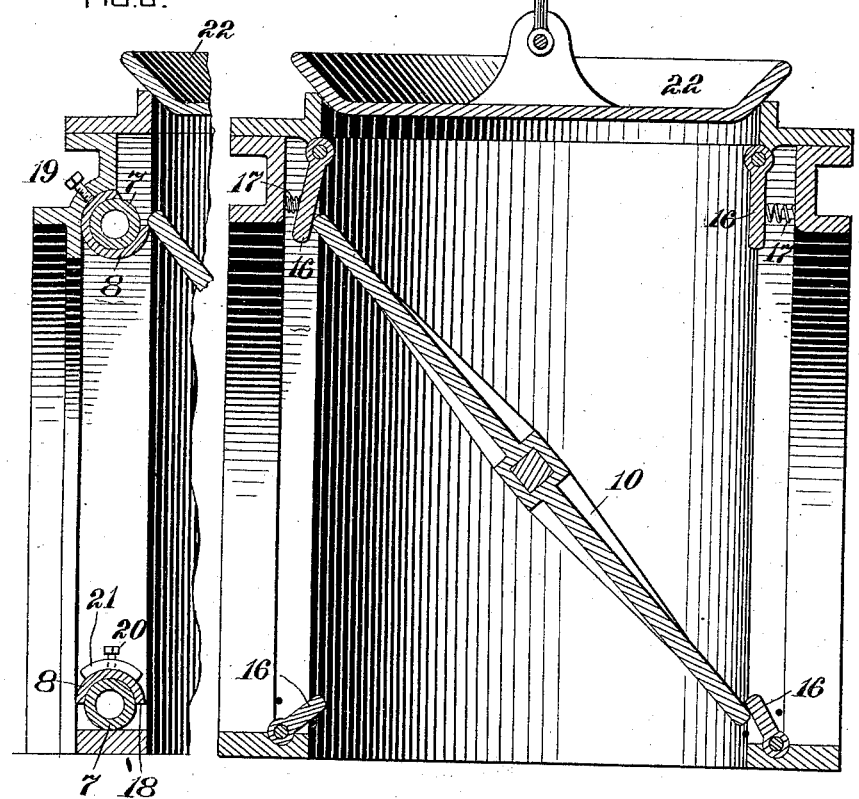

In the accompanying drawings, forming a part of this specification, Figure 1 is a view in sectional elevation of the reversing-valve and casing and the parts adjacent thereto. Fig. 2 is a sectional plan view, the plane of section being indicated by the line 2 2, Fig. 1. Fig. 3 is a view similar to Fig. 1, showing a modification in the construction of the valve casing and seat. Fig. 4 is a sectional plan view, the plane of section being indicated by the line 4 4, Fig. 3, and the hoods being shown in position on the sides of the valve-casing. Figs. 5 and 6 are sectional elevations showing certain modifications in the construction of the valve-seats.

In the practice of my invention the valve-casing 5 is preferably made with double walls, as shown in Fig. 2, so as to form water-chambers 6, whereby the valve-casing is prevented from being warped or burned out. As shown in Fig. 2, the inner side walls of the casing are made concave, as such form affords greater strength and rigidity. In the ends of the casing are formed windows or openings for the passage of gas and products of combustion, and transversely to these windows at the upper and lower ends thereof pipes 7 are connected with the water-chambers of the casing, so that the water may flow through such pipes and keep them cool and in proper condition. Around the pipes 7 are placed tubes 8, capable of rotation on the pipes and provided with projecting lugs 9, which form seats for the valve 10. As hereinbefore stated, the side walls of the casing are made concave, and the side edges of the valve are similarly shaped, so as to form, when the valves are in proper position, a close joint with the casing, and thereby prevent the escape of gas or products of combustion from one to the other side of the valve. In order that the valve may form this tight joint with the casing, and also with the valve-seat, as is equally necessary, a very close fitting or adjustment of the valve is necessary, and has heretofore been effected by chipping the valve-seats, so as to allow a further rotation of the valve until a tight joint is formed between it and the casing. In order to avoid this laborious and consequently expensive operation, the seats are made adjustable, as hereinbefore stated, being formed on a tube capable of rotation around a supporting-pipe.

As will be readily understood by those skilled in the art, the valve can be shifted until its side edges form a tight joint with the casing, and then the seats can be adjusted to form a tight joint with the ends of the valve. The tubes with their seats are held from rotation by being clamped between the sides of the valve-casing, which are drawn together by means of bolts 11, having nuts on their outer ends, as clearly shown in Fig. 2.

In the construction shown in Figs. 3 and 4 a single-wall casing is employed, and, as shown on the left of the figure, the tubes 8 are mounted upon pipes 12, provided with conical ends fitting into corresponding seats in the sides of the casing and held in position by bolts 11, which also serve to draw the sides of the casing together and clamp the tube 9 as against rotation. The tubes 8 may, if preferred, be mounted on bosses 13, formed on the sides of the casing, as clearly shown to the right of Fig. 4 and the upper portion of Fig. 3, the walls of the casing being in such case held together by small tubes 14, which are perforated inside of the tube 8, so that the latter may be kept cool by the circulation of air. The construction shown to the left of Figs. 3 and 4 can be so modified either by holes through the casing or in other suitable manner to permit of the circulation of air through the pipe 12. As clearly shown in Fig. 3, the tubes 8 can be held from rotation by means of set-screws 15 passing through the casing and impinging upon the tube.

In the construction shown in Fig. 5 a modified form of adjustable valve-seat is shown. The seat consists of a swinging plate 16, so pivoted to the casing as to lie within the range of movement of the ends of the valve. The upper plates are pressed toward the valve by means of springs 17, but the lower valves will of their own weight bear sufficiently hard against the valve to form a tight joint.

In lieu of forming the seat of the valve by a projection from the periphery thereof it may be formed by cutting away a portion of the tube 8 longitudinally, so that the valve will bear upon the shoulder 18 thus formed, as shown in Fig. 6. This sectional tube is capable of adjustment around the pipe 7, as hereinbefore described, and may be held from rotation by the clamping action of the sides of the casing or by means of a set-screw 19. The lower valves are preferably formed of half tubes, which rest upon the pipe 7 and are held thereon by means of set-screws 20 passing through curved lugs 21, formed on the casing.

It will be readily understood by those skilled in the art that by employing adjustable seats for the valve all the labor heretofore involved in obtaining tight joints around the edges thereof is entirely avoided, it simply being necessary to shift the valve until it forms a tight joint along its side edges with the casing and then adjust the valve-seats. In the construction shown in Fig. 5 this adjustment of the valve-seats is unnecessary, as the seats will automatically adjust themselves.

For clearness of illustration I have shown the gas-box 21 in position on top of the valve-casing and the saucer-valve 22 in position inside of the box. These parts form no part of the invention, and other means for conducting the gas and regulating its flow may be employed.

I claim herein as my invention—

1. In a furnace valve mechanism, the combination of a valve, and two or more seats for said valve, adjustable in the arc of a circle in the direction of movement of the valve, substantially as set forth.

2. In a furnace valve mechanism, the combination of a valve, tubes provided with seats for said valve, said tubes being capable of rotary adjustment, and means for introducing a cooling medium into the tubes, substantially as set forth.

3. In a furnace valve mechanism, the combination of a valve casing, pipes clamped between the sides of the valve casing, tubes provided with valve seats adjustably mounted on the pipes, a valve, and means for introducing a cooling medium into the tubes, substantially as set forth.

In testimony whereof I have hereunto set my hand.

WILLIAM SWINDELL.

Witnesses:
 DARWIN S. WOLCOTT,
 F. E. GAITHER.